US004001667B2

United States Statutory Invention Registration [19]

[11] Reg. Number: H1667

Poincloux et al.

[45] Published: Jul. 1, 1997

[54] SOLID POWDER COATING COMPOSITION

[75] Inventors: Jacques L. Poincloux; Rajesh Turakhia, both of Lake Jackson, Tex.

[73] Assignee: The Dow Chemical Company, Midland, Mich.

[21] Appl. No.: 116,088

[22] Filed: Sep. 2, 1993

[51] Int. Cl.[6] ..... C08F 20/00

[52] U.S. Cl. ..... 525/438

[58] Field of Search ..... 525/438

[56] References Cited

U.S. PATENT DOCUMENTS

| | | | |
|---|---|---|---|
| 3,397,254 | 8/1968 | Wynstra et al. . | |
| 4,085,159 | 4/1978 | Marsiat . | |
| 4,145,370 | 3/1979 | Sreeves | 525/438 |
| 4,147,737 | 4/1979 | Sein et al. | 525/438 |
| 4,340,698 | 7/1982 | De Jongh et al. | 525/438 |
| 4,365,046 | 12/1982 | Pesata, Jr. et al. . | |
| 4,370,452 | 1/1983 | Heater . | |
| 4,568,606 | 2/1986 | Hart et al. | 523/454 |
| 4,740,580 | 4/1988 | Merck et al. . | |
| 4,910,287 | 3/1990 | McLafferty et al. | 525/437 |
| 4,933,429 | 6/1990 | McCracken et al. | 525/438 |
| 4,997,907 | 3/1991 | Marten et al. | 525/437 |
| 5,006,612 | 4/1991 | Danick et al. | 525/438 |
| 5,250,634 | 10/1993 | Toyoda et al. | 525/438 |

FOREIGN PATENT DOCUMENTS

| | | |
|---|---|---|
| 56-67373 | 6/1981 | Japan . |
| 57-83564 | 5/1982 | Japan . |

*Primary Examiner*—Charles T. Jordan
*Assistant Examiner*—Anthony R. Chi
*Attorney, Agent, or Firm*—Charles J. Maurer, III

[57] ABSTRACT

Powder coating compositions that have a low melt viscosity contain:

(1) 20 to 80 parts of a multifunctional epoxy resin component;

(2) 80 to 20 parts of an essentially linear acid-terminated polyester resin component.

16 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOLID POWDER COATING COMPOSITION

BACKGROUND OF THE INVENTION

This invention relates to the art of powder coating resins and processes to use them.

It is well-known to use epoxy resins in powder coatings for articles. See, e.g., Tess, "Epoxy Resin Coatings", *Epoxy Resins* (2d Ed ) at 772–78 (Marcel-Dekker 1988); and 6 *Encyclopedia of Poly. Sci. & Eng.*, "Epoxy Resins" at 375 (J. Wiley & Sons 1986), which are incorporated herein by reference. In summary, a solid epoxy resin is mixed with a solid curing agent, and optionally pigments, fillers, stabilizers, and the like. The composition is solid at room temperatures but has a glass transition temperature. It is applied as a powder to a cold or heated substrate, which is usually metal, by methods such as electrostatic spraying, fluidized bed or electrostatic fluidized bed. The powder is heated either by heat from the substrate or by an external heat source, to cause it to melt, flow together, fuse and cure to form a coating.

For most nonweatherable applications, the epoxy resin is a solid advanced resin of bisphenol A and either epichlorohydrin or a diglyicidyl ether of bisphenol A. The curing agent is typically dicyanodiamide, an aromatic amine, a phenoxy resin, a polyanhydride, a novolac or a carboxyl-terminated polyester. Polyester resins are particularly desirable in some applications because of their excellent appearance, resistance to overbake, and mechanical properties. Common polyesters used are relatively low molecular weight (as compared with polyesters used in fabrics) and branched to promote cross-linking. See, e.g., Verborgt, U.S. Pat. No. 4,065,438 (Dec. 27, 1977) and Marsiat, U.S. Pat. No. 4,085,159 (April 18, 1978), which are incorporated herein by reference.

The viscosity of the epoxy-polyester powder coating resins presents an area for improvement. The polyester resins have a relatively high viscosity (such as about 150 to 200 poise for a mixture of 70 weight percent polyester and 30 weight percent epoxy resin) under curing conditions. (Viscosity is measured using an ICI cone and plate viscometer at 175° C.) Resins with a lower melt viscosity are desirable because they flow together and fuse better to provide a smoother and a more even appearance, and they are easier to process into a powder. It would be desirable to find a powder coating composition with substantially the same or better flow and/or appearance and lower viscosity under ordinary use conditions.

SUMMARY OF THE INVENTION

One aspect of the present invention is a solid powder-coating composition comprising:

(1) 20 to 80 parts (per hundred parts resins) of a multifunctional epoxy resin component; and (2) 80 to 20 parts (per hundred parts resin) of an essentially linear acid-terminated polyester resin component.

(Parts per hundred parts resin or "phr" relates the weight of a component to the total weight of epoxy resin component and polyester resin component in the composition—ignoring other components such as catalyst, pigment, etc.)

A second aspect of the present invention is a process to use the solid powder composition comprising the step of contacting the powder-coating composition with a substrate at a temperature high enough to cause the composition to melt and cure.

A third aspect of the present invention is a cured polymer resulting from curing the solid powder-coating composition.

A fourth aspect of the present invention is a coated article comprising:

(1) a substrate, and (2) a coating that comprises a cured powder-coating composition of the present invention.

The compositions of the present invention have a substantially lower overall viscosity under use temperature, and so they can provide a smoother and more even surface coating. Nevertheless, they provide good adhesion to the substrate, good mechanical properties, and good protection for the substrate.

DETAILED DESCRIPTION OF THE INVENTION

The present invention uses a multifunctional epoxy resin component. By multifunctional, we mean that the epoxy resin component contains on average more than two epoxy groups per molecule. The multifunctional epoxy resin component preferably contains on average at least about 2.05 epoxy groups per molecule, highly preferably contains on average at least about 2.3 epoxy groups per molecule, more preferably contains on average at least about 2.5 epoxy groups per molecule, and most preferably contains at least about 3 epoxy groups per molecule. The maximum number of epoxy groups is limited primarily by practical considerations, such as the viscosity of the resin and the ease of fabrication. Preferably, the resin contains no more than about 6 epoxy groups per molecule, and more preferably no more than about 4 epoxy groups per molecule on average.

The multifunctional epoxy resin component preferably has an average epoxy equivalent weight (EEW) of at least about 400, more preferably at least about 450, and most preferably at least about 500. The average EEW of the multifunctional epoxy resin component is preferably no more than about 1200, more preferably no more than about 900 and most preferably no more than about 560. The viscosity of the multifunctional epoxy resin component at 175° C. is preferably no more than about 50 poise and more preferably no more than about 30 poise. In most cases, the viscosity of the resin at about 175° C. will be at least about 5 or 10 poise.

The epoxy groups are typically glycidyl ether groups that result from reacting epihalohydrin with a multifunctional amine, thio or phenolic compound. They typically are represented by Formula I:

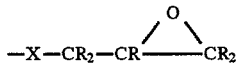

I wherein each R is independently hydrogen or a lower alkyl group (containing 1 to 8 carbon atoms), and X is —O—, —S— or —NR—. Each R is most preferably hydrogen. Each X is preferably oxygen.

The multifunctional epoxy resin component may contain a single multifunctional resin, or a mixture of resins. If it is a mixture of epoxy resins, then not all epoxy resins in the mixture need to be multifunctional, as long as the average for epoxy resins in the composition meets the previously-described criteria. The multifunctional epoxy resin component may optionally contain, for instance, at least one multifunctional epoxy resin and a difunctional resin, as long as their proportions are selected so that the entire epoxy resin component averages more than 2 epoxy groups per molecule. For instance, the multifunctional epoxy resin composition may contain a mixture of bisphenol A epoxy resin and epoxy novolac resins. Preferably, the amount of monofunctional epoxy resins in the epoxy resin component is minimized.

Suitable multifunctional epoxy resins and processes to make them are described in numerous published references such as: Walker, U.S. Pat. No. 4,868,059 (Sep. 19, 1989); Schrader, U.S. Pat. No. 4,474,929 (Oct. 2, 1984); Berman, U.S. Pat. No. 4,604,317 (Aug. 5, 1986); Wang, U.S. Pat. No. 4,672,103 (Jun. 9, 1987), which are incorporated herein by reference. Other multifunctional epoxy resins are commercially available from The Dow Chemical Company under the tradenames DER* 642U, DER* 672U and the DEN* series. (* registered trademark of The Dow Chemical Company). The multifunctional resins are usually glycidyl ethers of novolacs, tris-phenols, and triglycidylisocyanurate. Suitable epoxy resins are preferably represented by one of Formulae II or III:

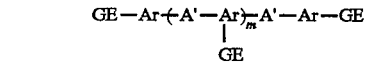

I

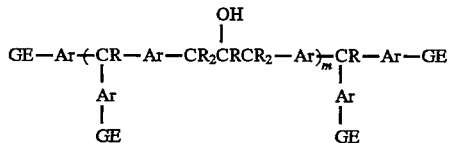

II wherein:

Each Ar represents a single aromatic ring or a plurality of fused or unfused aromatic rings. Each Ar is preferably carbocyclic and more preferably hydrocarbyl. It may have substituents that do not interfere with the manufacture or use of the epoxy resin. Substituents are preferably lower ($C_1$ to $C_8$) alkyl groups. Preferred examples of Ar include monovalent and multivalent benzene, toluene, naphthalene, biphenyl and 2,2-biphenylisopropylidene structures. Ar is most preferably a divalent or trivalent phenylene moiety.

Each GE is independently hydrogen or a glycidyl ether moiety of the Formula I, selected so that the resin contains on average more than 2 epoxy groups per molecule.

Each A' is independently a divalent moiety that does not interfere with the manufacture or use of the resin. A' may be, for instance, a carbonyl group, an oxygen atom, a sulfonyl group, or an alkyl group. A' is preferably an alkyl group.

Each m is selected such that the resin contains on average more than 2 epoxy groups per molecule.

The resins can be made by contacting a polyphenol (which corresponds to Formula II or III in which all GE are hydrogen atoms) with epichlorohydrin in the presence of a suitable catalyst. Such processes are well-known to persons of ordinary skill.

The present invention also uses an essentially linear (unbranched) acid-terminated polyester resin component. By "essentially linear" it is meant that the polyester resin component contains on average about two carboxylic acid groups per molecule or less. The polyester resin component preferably contains on average at least about 1.8 acid groups per molecule and more preferably at least about 1.9 acid groups per molecule. It preferably contains on average no more than about 2.2 acid groups per molecule and more preferably no more than about 2.1 acid groups per molecule. The average number of acid groups per polyester molecule is most preferably as close to two as possible.

The polyester backbone may contain aromatic moieties, such as result from the reaction of terephthalic acid, isophthalic acid or bisphenol A. It may also contain aliphatic moieties, such as the remnants of lower alkyl (1 to 8 carbon) diacids and diols—for instance: adipic acid, neopentyl glycol, ethylene glycol, and 1,6-hexanediol.

The optimum acid number of the polyester depends on the ratio of epoxy resin to polyester resin and the epoxy equivalent weight of the epoxy resin. In most cases, the acid number is preferably at least about 20 and more preferably at least about 25; it is preferably no more than about 150 and more preferably no more than about 110. The hydroxyl number of the polymer is preferably minimized; it is preferably no more than about 15 and more preferably no more than about 5. The number average molecular weight of the linear polyester is preferably at least about 1000 and most preferably at least about 2000. The number average molecular weight of the linear polyester is preferably no more than about 10,000, and more preferably no more than about 4000.

The viscosity of the polyester at 175° C. is preferably no more than about 125 poise, more preferably no more than about 100 poise, more highly preferably no more than about 75 poise, and most preferably no more than about 50 poise. The viscosity at 175° C. is almost always at least about 10 poise, frequently at least about 25 poise and often at least about 40 poise. The polyester preferably has a glass transition temperature of about 50° C. to about 80° C.

Suitable linear polyesters can be made by known processes the reaction of one or more dihydroxy compound with one or more diacid (or derivative of the diacid, such as an acid halide or ester). Examples of preferred diacids include: isophthalic acid, terephthalic acid, adipic acid. Examples of preferred dihydroxy compounds include: ethylene glycol, propylene glycol, neopentyl glycol and hexanediol. The quantity of multifunctional reagents (such as triacids or triols) used in the reaction is preferably minimized, since any branching increases the viscosity of the polyester. However, the reagents may contain small quantities of multifunctional reagent (such as about 1 weight percent or less) without unduly raising the viscosity of the resin, as long as the level of branching does not exceed the limits previously described.

The polyester is usually made using a catalyst such as dibutyl tin oxide. Examples of processes to make polyesters are described in Danick, U.S. Pat. No. 5,006,612 (Apr. 9, 1991); Merck et al., U.S. Pat. No. 4,740,580 (Apr. 26, 1988); and *Concise Ency. of Poly. Sci. & Eng.*, "Polyesters", at 793–799 (J. Wiley & Sons 1990), which are incorporated herein by reference.

The branched polyesters that are used in ordinary powder coatings have a high viscosity. The viscosity of the polyester resin can be significantly lowered by using an essentially linear polyester resin. Since the polyester resin is linear, the epoxy resin should be multifunctional to provide suitable crosslinking. The multifunctional epoxy resin has a somewhat higher viscosity than the linear epoxy resin, but the overall viscosity of the composition containing linear polyester and branched epoxy is significantly lower than the viscosity of the composition containing linear epoxy and branched polyester.

The epoxy resin and the polyester resin are preferably used in a ratio to provide about equivalent numbers of epoxy groups and acid groups within the composition. The composition preferably contains at least about 0.5 epoxy groups per acid group, more preferably at least about 0.75 epoxy groups and most preferably at least about 0.9 epoxy groups. The composition preferably contains no more than about 1.5 epoxy groups per acid group, more preferably no more than about 1.25 epoxy groups and most preferably no more than about 1.1 epoxy groups.

The weight ratio of epoxy resin component to polyester resin component is between about 20:80 and about 80:20. Compositions that contain more than about 50 phr epoxy resin (50:50 weight ratio) usually require specially tailored epoxy and polyester resins (with special acid number and epoxy equivalent weight) to meet the previously stated equivalency criteria. The preferred weight ratio of the epoxy resin component and the polyester resin component depends upon the composition of the resins and their equivalent weight per functional group. For the most common epoxy resin and polyester, the weight ratio of polyester resin component to epoxy resin component is preferably at least about 50:50 and most preferably at least about 60:40. The weight ratio of polyester component to epoxy component is preferably no more than about 75:25 and most preferably no more than about 70:30.

The composition preferably contains a catalyst to promote curing between the epoxy and the polyester resins. Such catalysts and their use are well known in the art. Examples of suitable curing catalysts include: amines and ammonium salts, phosphines and phosphonium salts, and imidazoles The use of catalysts such as 1-methylimidazole is also described in: McLafferty et al., U.S. Pat. No. 4,910,287 (Mar. 20, 1990), which is incorporated herein by reference. The composition preferably contains 0.01 to 1 part catalyst per 100 parts resin (phr); it more preferably contains about 0.05 to 0.2 phr catalyst. The composition may also contain curing agents for the epoxy resin, such as amines, polyphenols, imidazoles, and the like. It preferably contains no curing agent other than the polyester resin. The composition may also contain other additives, such as fillers, stabilizers, pigments, flow-modifiers and anti-cratering agents.

The components of the composition are typically premixed before they are used. For instance, they may be extruded together at a temperature below their curing temperature, and then converted to a powder. The powder composition preferably contains particles of a size suitable for powder coating applications. The average particle size is preferably at least about 5 μm in diameter and more preferably at least about 10 μm. The average particle size is preferably no more than about 100 μm and more preferably no more than about 50 μm.

The powder coating may be applied in a manner that is usual for powder coating resins. Powder coating application and use is described in detail at Tess, "Epoxy Resin Coatings", *Epoxy Resins* (2d Ed.) at 772–78 (Marcel-Dekker 1988), which is incorporated herein by reference. In summary, the powder may be applied to a heated substrate, so that heat from the substrate causes the powder to melt, flow and cure; or the powder may be applied to a cool substrate which is subsequently heated to make the powder melt, flow and cure. The curing temperature is preferably between about 140° C. and about 200° C.

The substrate is usually metal, such as steel, although it may be any material that can withstand curing temperatures. The powder is applied to the substrate by known methods such as electrostatic spraying, fluidized bed application, or electrostatic fluidized bed. The process is preferably continued until the cured coating has a thickness of at least about 1 mil and most preferably at least about 2 mil. In most cases, the coating is preferably no more than about 4 mil thick. The powder coating should be heated long enough to cure to meet required properties. It is preferably heated for at least about 5 min. The coating is preferably cured for no more than about 20 min., although this is not critical.

The cured coating of the present invention preferably has additional advantages over cured coatings of the prior art, such as good appearance, good direct/reverse impact resistance, good pencil hardness and good 60° gloss.

ILLUSTRATIVE EXAMPLES

The following examples are for illustrative purposes only. They do not limit either the specification or the claims. Unless otherwise stated, all parts and percentages are by weight.

Example 1

A linear polyester is made by the following process.

A mixture containing 528 g of neopentyl glycol, 581 g of terephthalic acid, and 50 g of adipic acid is heated to 150° C. A 1.5 g quantity of FASCAT 4202 catalyst and 0.5 g of FASCAT 4100 catalyst are added. The temperature is increased slowly to 250° C. After 130 g of water have been collected from the reaction mixture, 276 g of isophthalic acid is added. The reaction is continued for 4 hours at 250° C. The resulting polyester resin is recovered by casting on a foil surface and grinding the cast precipitate. It has an acid number of 43, a hydroxyl number of 1, and a viscosity of 50 poise at 175° C. (as measured by ICI cone and plate viscosimeter). The polyester resin has a glass transition temperature at 57° C. (as measured by differential scanning calorimeter) and a number average molecular weight of 2137 (as measured by gel permeation chromatography).

The following powder coating elements are weighted and premixed: 910 g polyester resin, 390 g of DER* 642U epoxy resin commercially available from The Dow Chemical Company, 676 g of TI R960 titanium dioxide pigment, 8 g of benzoine, 16 g of RESIFLOW P67 flow-modifier, and a phosphonium catalyst. The premix is extruded through an extruder with a barrel temperature of about 200° F. The extrudate is crushed and then ground on a BRINKMANN grinder using a 12 tooth wheel and 0.5 screen. The resulting powder is sieved through a number 140 wire mesh sieve. The powder is applied to cold rolled steel panels using a WAGNER G-100 electrostatic spray gun. The panels are baked in an oven at 180° C. for 15 minutes to melt and cure the coating.

The cured coating has the following characteristics:

(a) film thickness: 2 mil +/− 0.2 (measured by ASTM 1186-87);

(b) direct impact resistance: 60/160 in-lbs (as measured by the Gardner impact test ASTM D 2794-90);

(c) pencil hardness: H (measured by ASTM D 3363-74);

(d) 60 percent gloss: 95% (as measured by ASTM D 523-89.

Visual inspection shows no pinholes, craters or "orange peel" texture.

What is claimed is:

1. A solid powder coating composition comprising:

(1) 20 to 80 phr of an epoxy resin component that contains on average more than two epoxy groups per molecule;

(2) 80 to 20 phr of an essentially linear acid-terminated polyester resin component.

2. The solid powder coating composition of claim 1 wherein the multifunctional epoxy resin component contains on average at least about 2.05 epoxy groups per molecule.

3. The solid powder coating composition of claim 1 wherein the multifunctional epoxy resin component has an epoxy equivalent weight of between about 450 and about 900.

4. The solid powder coating composition of claim 1 wherein the epoxy resin component contains an epoxy resin that has a first epoxy resin that contains on average more than 2 epoxy groups per molecule and a second epoxy resin that contains about 2 epoxy groups per molecule.

5. The solid powder coating composition of claim 1 wherein the polyester resin component contains on average about 1.8 to 2.2 acid groups per molecule.

6. The solid powder coating composition of claim 5 wherein the polyester resin component contains on average no more than about 2.1 acid groups per molecule.

7. The solid of Claim 5 wherein the polyester resin contains on average no more than about component contains on average no more than about 2 acid groups per molecule.

8. The solid powder coating composition of claim 1 wherein the polyester resin has an acid number between about 20 and about 110.

9. The solid powder coating composition of claim 1 wherein the polyester resin has a viscosity of no more than about 100 poise at 175° C.

10. The solid powder coating composition of claim 1 wherein the polyester resin has a viscosity of no more than about 75 poise at 175° C.

11. The solid powder coating composition of claim 1 wherein the polyester resin has a viscosity of no more than about 50 poise at 175° C.

12. The solid powder coating composition of claim 1 wherein the composition contains about 50 to 70 phr polyester and about 50 to 30 phr epoxy resin.

13. A cured powder coating composition of claim 1.

14. A coated article comprising a substrate and a coating on the substrate that contains a cured composition of claim 1.

15. A process to use the solid powder coating composition of claim 1, comprising the step of contacting a substrate with the powder coating composition at a temperature high enough to cause the composition to melt and cure.

16. A solid powder coating composition comprising:

(1) about 30 to about 50 phr of a multifunctional epoxy resin component that contains on average about 2.05 to about 6 epoxy groups per molecule; and (2) about 70 to about 50 phr of an essentially linear acid-terminated polyester component that contains on average about 1.8 to about 2 carboxylic acid groups per molecule and has an number average molecular weight of about 1000 to about 10,000.

* * * * *